United States Patent
Usui

(10) Patent No.: US 9,357,133 B2
(45) Date of Patent: May 31, 2016

(54) DIGITAL PHOTOGRAPHING APPARATUS, AUTO-FOCUSING METHOD, AND COMPUTER-READABLE STORAGE MEDIUM FOR EXECUTING THE AUTO-FOCUSING METHOD

(75) Inventor: Takafumi Usui, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 34 days.

(21) Appl. No.: 13/480,649

(22) Filed: May 25, 2012

(65) Prior Publication Data

US 2012/0307130 A1  Dec. 6, 2012

(30) Foreign Application Priority Data

May 30, 2011  (KR) .................. 10-2011-0051663

(51) Int. Cl.
*H04N 5/232* (2006.01)
*G02B 7/36* (2006.01)
*H04N 5/345* (2011.01)
*H04N 5/369* (2011.01)

(52) U.S. Cl.
CPC .............. *H04N 5/23293* (2013.01); *G02B 7/36* (2013.01); *H04N 5/23212* (2013.01); *H04N 5/3456* (2013.01); *H04N 5/3696* (2013.01)

(58) Field of Classification Search
USPC ...................................................... 348/302
See application file for complete search history.

(56) References Cited

U.S. PATENT DOCUMENTS

| | | | |
|---|---|---|---|
| 6,829,008 B1* | 12/2004 | Saga et al. ................ | 348/302 |
| 2005/0094012 A1 | 5/2005 | Gomi et al. | |
| 2007/0126909 A1 | 6/2007 | Kuruma | |
| 2009/0086084 A1 | 4/2009 | Komaba et al. | |
| 2009/0122171 A1* | 5/2009 | Suzuki ...................... | 348/294 |
| 2009/0140122 A1* | 6/2009 | Suzuki ...................... | 250/201.2 |
| 2010/0045849 A1* | 2/2010 | Yamasaki .................. | 348/349 |
| 2010/0220899 A1* | 9/2010 | Steinberg et al. .......... | 382/118 |
| 2011/0102663 A1* | 5/2011 | Ichimiya ................... | 348/345 |
| 2011/0267533 A1* | 11/2011 | Hirose ...................... | 348/345 |

FOREIGN PATENT DOCUMENTS

| | | | |
|---|---|---|---|
| JP | 2007-150643 A | 6/2007 | |
| JP | 2007-214792 A | 8/2007 | |
| JP | 2009-089143 A | 4/2009 | |
| JP | 4334950 B2 | 9/2009 | |

* cited by examiner

*Primary Examiner* — Roberto Velez
*Assistant Examiner* — Stephen Coleman
(74) *Attorney, Agent, or Firm* — Drinker Biddle & Reath LLP

(57) ABSTRACT

An apparatus, computer readable medium, and method for auto-focusing, the method including reading out a live-view signal from first group pixels; reading out an auto-focusing detection signal from second group pixels; and auto-focusing using the live-view signal and the auto-focusing detection signal, wherein the first group pixels and the second group pixels do not substantially overlap.

20 Claims, 11 Drawing Sheets

DIGITAL PHOTOGRAPHING APPARATUS, AUTO-FOCUSING METHOD, AND COMPUTER-READABLE STORAGE MEDIUM FOR EXECUTING THE AUTO-FOCUSING METHOD

CROSS-REFERENCE TO RELATED PATENT APPLICATION

This application claims the benefit of Korean Patent Application No. 10-2011-0051663, filed on May 30, 2011, in the Korean Intellectual Property Office, the entire disclosure of which is incorporated herein by reference.

BACKGROUND

1. Field of the Invention

Embodiments of the invention relate to a digital photographing apparatus, an auto-focusing method, and a computer-readable storage medium for storing program codes for executing the auto-focusing method.

2. Description of the Related Art

Digital photographing apparatuses often include an imaging device for converting an optical signal into an electrical signal. Moreover, a live-view screen is often provided to assist the user in capturing images. The live-view screen displays an image currently generated by the imaging device by using a signal detected by the imaging device. Additionally, the digital photographing apparatuses often provides auto-focusing that may include moving the lens and iris in an attempt to focus a region of the image. It may be difficult for the digital photographing apparatus to provide both a live view image that is refreshed frequently and accurate auto-focusing.

SUMMARY

Therefore, there is a need in the art for an auto-focusing computer program product, apparatus, and method, the method comprising using a signal generated by an imaging device, in which a live-view screen is continuously provided while low-frequency auto-focusing and high-frequency auto-focusing are simultaneously executed.

An auto-focusing method is disclosed. The auto-focusing method including: reading out a live-view signal from a first group of pixels; reading out an auto-focusing detection signal from a second group of pixels; and auto-focusing using the live-view signal and the auto-focusing detection signal, wherein the first group of pixels and the second group of pixels do not substantially overlap.

The auto-focusing may include executing low-frequency auto-focusing using the live-view signal; and executing high-frequency auto-focusing using the auto-focusing detection signal.

The first group of pixels may be spaced apart from each other at constant intervals, and the second group of pixels may be adjacent to each other.

The second group of pixels may be selected from among pixels in an area in which the first group of pixels are not located.

The auto-focusing method may include detecting a face by using the live-view signal; and determining the second group of pixels according to where the face is detected.

The first group of pixels may be continuously exposed when the auto-focusing detection signal is read out, and the second group pixels may be continuously exposed when the live-view signal is read out.

A digital photographing apparatus is disclosed. The digital photographing apparatus including an imaging device comprising a plurality of pixels comprising a first group of pixels and a second group of pixels; an optical system that collects an optical signal and transmits the optical signal to the imaging device; and an auto-focusing processing unit configured to execute auto-focusing by using a live-view signal detected from the first group of pixels and an auto-focusing detection signal detected from the second group of pixels, and configured to control the optical system, wherein the first group of pixels and the second group of pixels do not substantially overlap.

The auto-focusing processing unit may be configured to execute auto-focusing by using a low frequency detection signal generated from the live-view signal and a high frequency detection signal generated from the auto-focusing detection signal.

The digital photographing apparatus may include an auto-focusing signal processing unit configured to process the live-view signal and the auto-focusing detection signal.

The auto-focusing signal processing unit may include a low frequency signal processing unit configured to generate a low frequency detection signal by using the live-view signal; and a high frequency signal processing unit configured to generate a high frequency detection signal by using the auto-focusing detection signal.

The imaging device may include a first gate driving unit configured to sequentially output a first selection signal for reading out the first group of pixels and configured to sequentially output a first reset signal for resetting the first group of pixels; a second gate driving unit configured to sequentially output a second selection signal for reading out the second group of pixels and configured to sequentially output a second reset signal for resetting the second group pixels; a read out unit configured to read out a detection signal from the pixels; and an output unit configured to output a live-view signal by selecting detection signals of the first group pixels from among the read out signals, or an auto-focusing detection signal by selecting detection signals of the second group of pixels from among the read out signals.

The first group of pixels may be pixels that are spaced apart from each other at constant intervals, and the second group of pixels may be pixels that are adjacent to each other.

The second group of pixels may be selected from among pixels in an area in which the first group of pixels are not located.

The digital photographing apparatus may include a face detection unit configured to detect a face from the live-view signal, wherein the auto-focusing processing unit determines the second group of pixels according to where the face is detected.

The first group of pixels may be continuously exposed when the auto-focusing detection signal is read out, and the second group pixels may be continuously exposed when the live-view signal is read out.

A non-transitory computer program product is disclosed. The non-transitory computer program product may include a computer usable medium having a computer readable program code embodied therein, where said computer readable program code is adapted to be executed to implement a method for auto-focusing.

The auto-focusing method may include reading out a live-view signal from a first group of pixels; reading out an auto-focusing detection signal from a second group of pixels; and auto-focusing using the live-view signal and the auto-focusing detection signal, wherein the first group of pixels and the second group of pixels do not substantially overlap.

The auto-focusing may include executing low-frequency auto-focusing using the live-view signal; and executing high-frequency auto-focusing using the auto-focusing detection signal.

The first group of pixels are pixels that may be spaced apart from each other at constant intervals, and the second group of pixels may be pixels that are adjacent to each other.

The second group of pixels may be selected from among pixels in an area in which the first group of pixels are not located.

The auto-focusing method may include detecting a face by using the live-view signal; and determining the second group of pixels according to where the face is detected.

The first group of pixels may be continuously exposed when the auto-focusing detection signal is read out, and the second group of pixels may be continuously exposed when the live-view signal is read out.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The following description and attached drawings are presented and used to understand operations according to the invention, and a part that is obvious to one of ordinary skill in the art may not be described herein.

In addition, the specification and the attached drawings are provided not to limit the scope of the invention, which should be defined by the claims. The terms used herein should be interpreted as the meaning and concept most appropriate for the technical spirit of the invention.

Hereinafter, embodiments of the invention will be described in detail with reference to the attached drawings.

Figure 1:
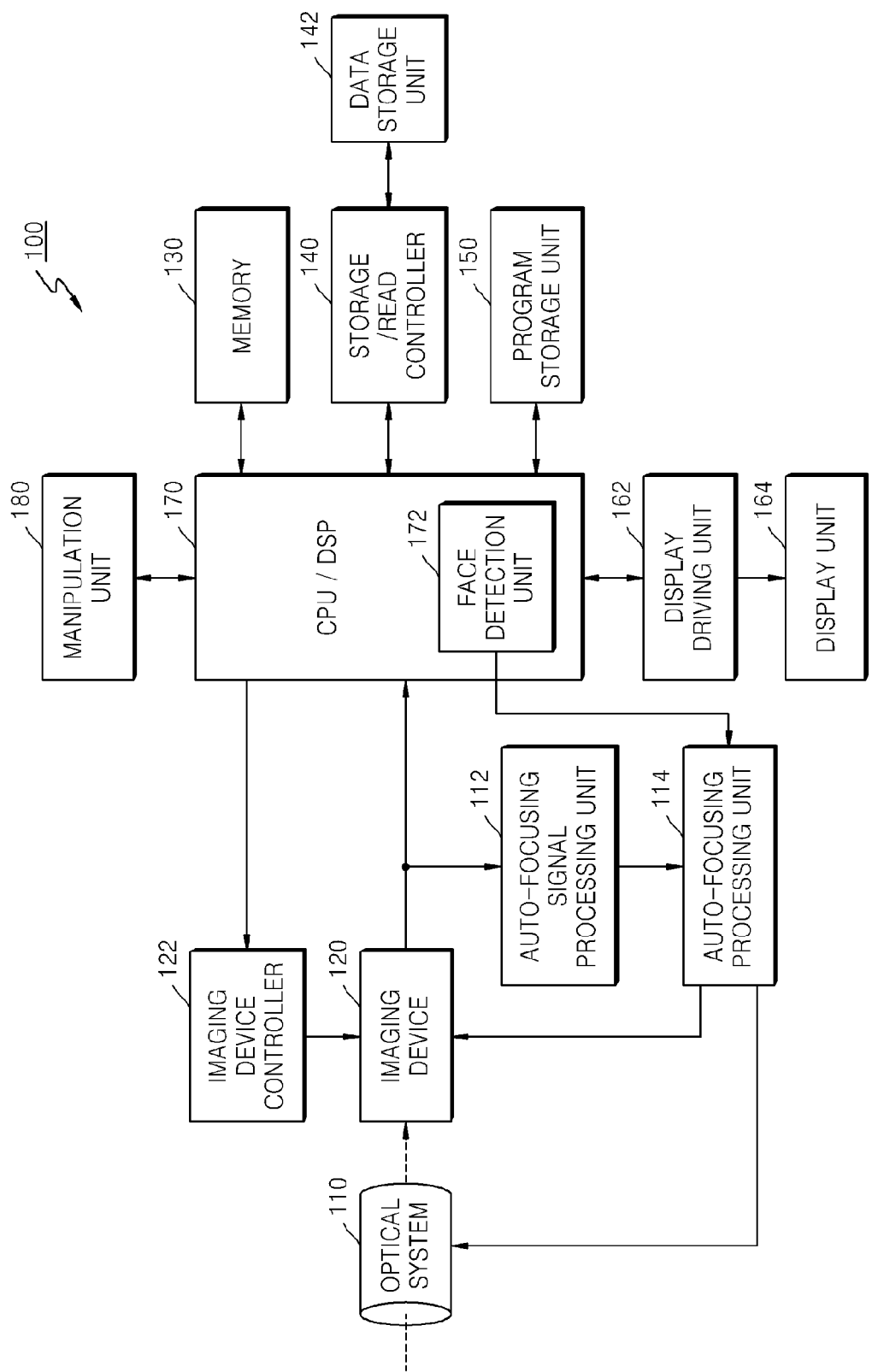
FIG. 1 is a schematic view of an example of a digital photographing apparatus according to an embodiment of the invention.

FIG. 1 is a schematic view of an example of a digital photographing apparatus 100 according to an embodiment of the invention.

The digital photographing apparatus 100 according to the current embodiment includes an optical system 110, an auto-focusing signal processing unit 112, an auto-focusing processing unit 114, an imaging device 120, an imaging device controller 122, a memory 130, a storage/read controller 140, a data storage unit 142, a program storage unit 150, a display driving unit 162, a display unit 164, a CPU/DSP 170, and a manipulation unit 180.

The overall operation of the digital photographing apparatus 100 is controlled by the CPU/DSP 170. The CPU/DSP 170 transmits control signals to the imaging device controller 122 and the auto-focusing processing unit 114 for operations of each of the components of the digital photographing apparatus 100.

The optical system 110 controls optical characteristics of incident light, a pathway of incident light, and intensity of incident light. The optical system 110 may include at least one lens and an iris that are located on a lens barrel.

The lens may include a plurality of lenses. Locations of the lenses may be controlled according to a control signal transmitted by the auto-focusing processing unit 114.

The iris may control the intensity of light that enters the imaging device 120, and an exposure level of the iris may be controlled by the auto-focusing processing unit 114 or an exposure controller (not shown). The exposure level of the iris may be defined using an f number.

An optical signal transmitted through the optical system 110 forms an image of an object at a light receiving surface of the imaging device 120. The imaging device 120 may include a charge coupled device (CCD) image sensor for converting an optical signal into an electrical signal, or a complementary metal oxide semiconductor image sensor (CIS). The imaging device controller 122 may control, for example, sensitivity of the imaging device 120. The imaging device controller 122 may control the imaging device 120 according to either a control signal that is automatically generated in correspondence to an image signal that is input in real time, or a control signal that is manually input by user's manipulation.

An exposure time of the imaging device 120 may be controlled by a shutter (not shown). The shutter (not shown) may be a mechanical shutter for controlling entering of light by moving a cover (light shielding film), or an electronic shutter for controlling light exposure by supplying an electrical signal to the imaging device 120.

According to an embodiment of the invention, the imaging device 120 includes first group of pixels G1 and second group of pixels G2. The first group of pixels G1 each generate a live-view signal for generating a live-view screen. The second group of pixels G2 each generate an auto-focusing detection signal for executing high-frequency auto-focusing. The imaging device 120 according to an embodiment of the invention will now be described in detail.

The auto-focusing signal processing unit 112 processes a live-view signal and an auto-focusing detection signal transmitted by the imaging device 120 in proper forms so as to generate detection signals, and transmits the detection signals to the auto-focusing processing unit 114. According to an embodiment of the invention, the auto-focusing signal processing unit 112 may generate a low frequency detection signal and a high frequency detection signal. Also, the auto-focusing signal processing unit 112 may calculate a peak and an average from each of the live-view signal and the auto-focusing detection signal, and may output the peak and the average.

The auto-focusing processing unit 114 executes auto-focusing using detection signals provided by the auto-focusing signal processing unit 112. According to an embodiment of the invention, the auto-focusing processing unit 114 may execute auto-focusing by referring to a low frequency detection signal and a high frequency detection signal and may find an in focus position. Also, the auto-focusing processing unit 114 may execute contrast auto-focusing using a contrast component to find an in focus position. The auto-focusing processing unit 114 controls the optical system 110 by calculating a set value with respect to the optical system 110 according to results of the auto-focusing. For example, the auto-focusing processing unit 114 may control the location of a lens or the exposure level of the iris.

Also, the auto-focusing processing unit 114 may control the optical system 110 so as to detect a detection signal while a set value with respect to the optical system 110 is changed for auto-focusing. For example, the auto-focusing processing unit 114 may scan an entire focal distance range while a lens is moved within an entire driving range. Also, the auto-focusing processing unit 114 may change the f number of the iris so as to detect a detection signal.

Also, the digital photographing apparatus 100 may include the display unit 164 for displaying an operational state of the digital photographing apparatus 100 or image information captured by the digital photographing apparatus 100. The display unit 164 may provide visual information and/or auditory information to a user. To provide visual information, the display unit 164 may include, for example, a liquid crystal display panel (LCD) or an organic light-emitting display (OLED) panel. Also, the display unit 164 may be a touch screen for recognizing touch input.

The display driving unit 162 may provide a driving signal to the display unit 164. During operation in a live-view mode, the display driving unit 162 may generate a data signal from the live-view signal and supply the data signal to the display unit 164, and the display unit 164 may display a live-view.

The CPU/DSP 170 processes an input image signal, and according to the input image signal or an external input signal, the CPU/DSP 170 controls corresponding components. The CPU/DSP 170 may reduce noise with respect to input image data, and may execute an image signal process for improving image quality, and examples of the image signal process are gamma correction, color filter array interpolation, color correction, and color enhancement. Also, the CPU/DSP 170 may compress image data that is generated by executing an image signal process for improving image quality so as to generate an image file, or may restore the image data from the image file. The compression of an image may be performed according to a reversible format or a non-reversible format. As an example of an appropriate format, in a case of a still image, an image may be converted into, for example, a joint photographic experts group (JPEG) format or a JPEG 2000 format. Also, in a case of a moving image, a plurality of frames are compressed according to a moving picture experts group (MPEG) standard to generate a moving image file. An image file may be generated according to, for example, an exchangeable image file format (Exif) standard.

Image data output by the CPU/DSP 170 may be input to the storage/read controller 140 via the memory 130, or may be input directly to the storage/read controller 140. The storage/read controller 140 stores the image data in the data storage unit 142 either automatically or according to a signal input by a user. Also, the storage/read controller 140 reads image data from an image file stored in the data storage unit 142, and inputs the image data to the display driving unit 162 via the memory 130 or other pathways, thereby allowing an image to be displayed on the display unit 164. The data storage unit 142 may be detachable from the digital photographing apparatus 100 or may be permanently installed in the digital photographing apparatus 100.

Also, the CPU/DSP 170 may execute an indistinctness process, a color process, a blur process, an edge enhancement process, an image interpretation process, an image recognition process, an image effect process, etc. Also, as the image recognition process, a face recognition process, a scene recognition process, etc. may be executed. According to an embodiment of the invention, the CPU/DSP 170 may include a face detection unit 172 that detects whether or where a face exists by using an imaging signal input by the imaging device 120. Also, the CPU/DSP 170 may execute a display image signal process for display on the display unit 164. For example, the CPU/DSP 170 may execute brightness level control, color correction, contrast control, outline enhancement control, a screen split process, a process for generating, for example, a character image, an image synthesis process, etc. The CPU/DSP 170 may be connected to an external monitor and execute a predetermined image signal process for display on the external monitor, and may transmit processed image data so as to display a corresponding image on the external monitor.

Also, the CPU/DSP 170 may perform various functions by executing programs stored in the program storage unit 150.

The manipulation unit 180 is where a user inputs a control signal. The manipulation unit 180 may include various functional buttons, including a shutter-release button for inputting a shutter-release signal for capturing a picture by exposing the imaging device 120 to light for a predetermined period of time, a power button for inputting a control signal for controlling on-off of power, a zoom button for widening or narrowing an image angle according to an input, a mode selection button, a photographing set value control button, etc. The manipulation unit 180 may be embodied as any one of various forms that allow a user to input a control signal, and may be, for example, a button, a key board, a touch pad, a touch screen, or a remote controller.

Figure 2:
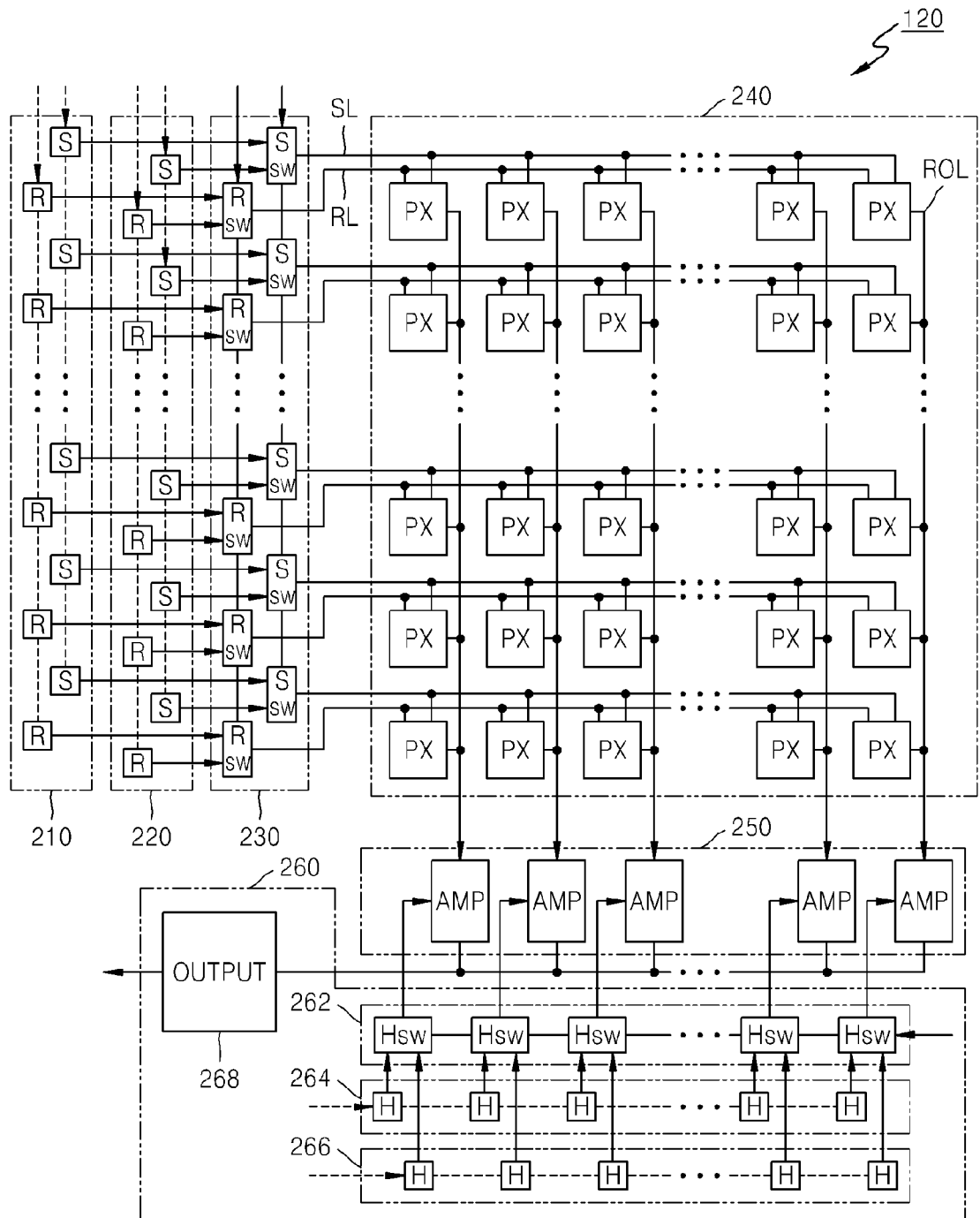
FIG. 2 is a view of an example of an imaging device according to an embodiment of the invention.

FIG. 2 is a view of the imaging device 120 according to an embodiment of the invention.

The imaging device 120 according to the current embodiment may include a first gate driving unit 210, a second gate driving unit 220, a first selection unit 230, a pixel unit 240, a read out unit 250, and an output unit 260. The output unit 260 may include a second selection unit 262, a first selection controller 264, a second selection controller 266, and a signal output unit 268.

The imaging device 120 according to the embodiment includes the pixel unit 240 in which a plurality of pixels PX are arranged. The pixels PX may each be connected to a selection line RL for transmitting a selection signal output by the first selection unit 230, and a reset line SL for transmitting a reset signal. Also, the pixels PX are each connected to a read out line ROL for transmitting an imaging signal output by a corresponding pixel PX.

Each of the pixels PX may include, as described above, a CCD image sensor or a CIS to convert an optical signal into an electrical imaging signal. Also, the imaging device 120 may include a plurality of transistors for controlling an input of selection and reset signals to the pixels PX and an output of an imaging signal from the pixels PX.

The pixel unit 240 according to the current embodiment may include the first group of pixels G1 and the second group of pixels G2.

Figure 3:
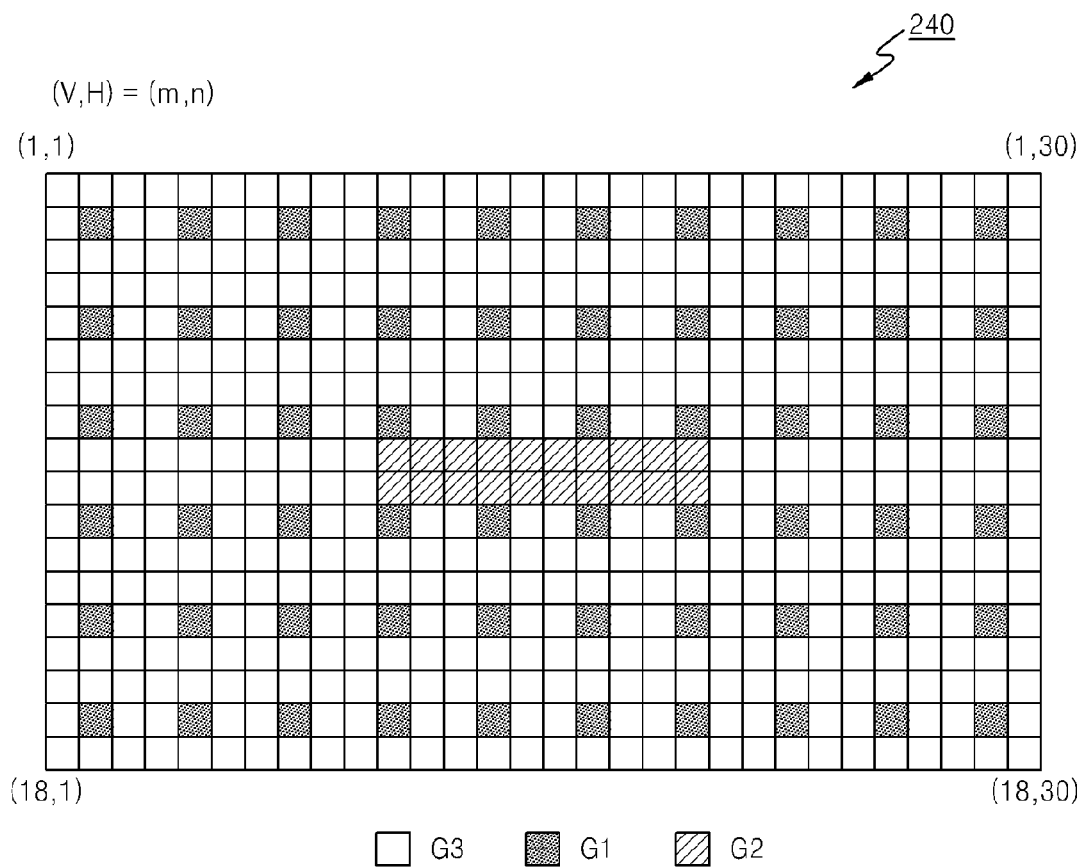
FIG. 3 is a view illustrating an example of an arrangement of a plurality of pixels PX according to an embodiment of the invention.

FIG. 3 is a view illustrating an example of an arrangement of a plurality of pixels PX according to an embodiment of the invention. The pixels PX according to the current embodiment may include the first group of pixels G1, the second group of pixels G2, and third group of pixels G3.

As illustrated in FIG. 3, the first group of pixels G1 may be spaced from each other at constant intervals. In FIG. 3, the first group of pixels G1 are spaced apart from each other by a distance corresponding to two pixels. However, the arrangement of the first group pixels G1 is exemplary only, and the intervals between the first group of pixels G1 may vary according to embodiments. Also, the intervals between the first group of pixels G1 may differ with respect to a vertical direction and a horizontal direction.

An imaging signal generated by each of the first group of pixels G1 may be used as a live-view signal for generating a live-view screen. Often, a live-view does not require high resolution, but requires a high frame rate. Accordingly, as illustrated in FIG. 3, a high frame rate may be obtained by disposing the first group of pixels G1.

Also, for auto-focusing, the live-view signal may be input to the auto-focusing signal processing unit 112. According to an embodiment of the invention, the live-view signal may be used to execute low-frequency auto-focusing.

The second group of pixels G2 may be located adjacent to each other in a region in which the first group pixels G1 are not located. The second group of pixels G2 may be located in any one of various regions in which the first group pixels G1 are not located. Also, unlike the arrangement of the second group of pixels G2 adjacent to each other as illustrated in FIG. 3, the second group of pixels G2 may also be located spaced from each other. In embodiments, the first group of pixels G1 and the second group of pixels G2 do not substantially overlap. Substantially not overlap means that the auto-focus information received from G1 and G2 would not be substantially reduced by the overlapping pixels compared with the total number of pixels. In embodiments, substantially means that less than half of the pixels would be present in both G1 and G2. In embodiments, the first group of pixels G1 and the second group of pixels G2 do not overlap.

An imaging signal generated by each of the second group of pixels G2 may be used as an auto-focusing detection signal. Since the auto-focusing detection signal is generated by adjacent second group of pixels G2, the auto-focusing detection signal includes a high frequency component. Accordingly, according to an embodiment of the invention, high-frequency auto-focusing may be executed using the auto-focusing detection signal. As described above, an auto-focusing detection signal including a high frequency component may be generated by arranging the second group of pixels G2 to be adjacent to each other. By doing so, auto-focusing performance may be substantially increased compared to auto-focusing using only a live-view signal including a relatively low ratio of the high frequency component. Also, by locating the second group of pixels G2 where the first group of pixels G1 do not exist, even when an auto-focusing detection signal is generated and read out, the first group of pixels G1 for generating a live-view signal is exposed, and thus the first group of pixels G1 and the second group of pixels G2 are continuously exposed.

The third group of pixels G3 may be pixels other than the first group of pixels G1 and the second group of pixels G2. An imaging signal generated by each of the third group pixels G3 may not be read out during a live-view mode. However, when an image is captured or a moving image is recorded, the imaging signals may be read out.

Referring to FIG. 2, according to another embodiment, the imaging device 120 may include the first gate driving unit 210 and the second gate driving unit 220. The first gate driving unit 210 generates a first selection signal and a first reset signal that are to be supplied to the first group of pixels G1 in a live-view mode. Also, the first gate driving unit 210 may generate a first selection signal and a first reset signal that are to be supplied to the first group of pixels G1 and the third group of pixels G3, when a shutter-release signal is input, or when a moving image is recorded. Selecting of a pixel to which the first selection signal and the first reset signal are to be transmitted may be controlled by the first gate driving unit 210 or the first selection unit 230.

The second gate driving unit 220 generates a second selection signal and a second reset signal that are to be supplied to the second group of pixels G2 in a live-view mode.

The first gate driving unit 210 and the second gate driving unit 220 may be embodied as a shift register. As illustrated in FIG. 2, each of the first gate driving unit 210 and the second gate driving unit 220 may include a shift register in which stages S for generating a first or second reset signal are connected in a cascade form, and a shift register in which stages R for generating a first or second selection signal are connected in a cascade form. Also, wave forms of the first or second selection signal and the first or second reset signal may be controllable by regulating a wave form of a pulse that is input to the shift registers of the first gate driving unit 210 and the second gate driving unit 220.

Any one of the first selection signal input by the first gate driving unit 210 and the second selection signal input by the second gate driving unit 220 is selected and output to a selection line RL. The first selection unit 230 may include R switches Rsw connected in a cascade form so as to select any one of the first selection signal and the second selection signal. Also, the first selection unit 230 selects any one of the first reset signal input by the first gate driving unit 210 and the second reset signal input by the second gate driving unit 220 and outputs the selected signal to a reset line SL. The first selection unit 230 may include S switches Ssw connected in a cascade form so as to select any one of the first reset signal and the second reset signal. The R switches Rsw may select any one of the first selection signal and the second selection signal to be output, according to an R selection control signal. The S switches Ssw may select any one of the first reset signal and the second reset signal that is to be output, according to an S selection control signal.

According to an embodiment of the invention, the first gate driving unit 210 and the second gate driving unit 220 may be separately provided, and the first and second selection signals and the first and second reset signals may be generated without any setting change.

The invention is not limited to the current embodiment in which the first gate driving unit 210 and the second gate driving unit 220 are separately provided. For example, according to another embodiment, only one gate driving unit may be used to generate selection and reset signals with respect to the first group pixels G1 and the second group pixels G2. In this embodiment, the first selection unit 230 may not be used.

The read out unit 250 reads out an imaging signal output via a read out line ROL according to a selection signal that is input via a selection line RL. To detect the imaging signal, the read out unit 250 may include a plurality of amplifiers AMP. The amplifiers AMP may be located respectively corresponding to columns.

The output unit 260 may select imaging signals of either a portion of the columns or all of the columns, among imaging signals read out by the read out unit 250, and may output the selected signals. The output unit 260 may include the first selection controller 264 and the second selection controller 266. The first selection controller 264 generates a first column selection signal for selecting a column corresponding to the first group pixels G1. The second selection controller 266 generates a second column selection signal for selecting a column corresponding to the second group pixels G2. The first selection controller 264 and the second selection controller 266 may each be embodied as a shift register including a plurality of stages H for generating a first or second column selection signal.

The second selection unit 262 of the output unit 260 may receive the first column selection signal and the second column selection signal, select any one of the first column selection signal and the second column selection signal, and output a signal for selecting the selected column to a plurality of amplifiers AMP of the read out unit 250. The second selection unit 262 may include a plurality of switches Hsw connected in a cascade form. The amplifiers AMP of the read out unit 250, when selected according to a row selection signal, output a detected imaging signal to the signal output unit 268.

The signal output unit 268 outputs the imaging signal output by the read out unit 250, to the CPU/DSP 170 and the auto-focusing signal processing unit 112.

Figure 4:
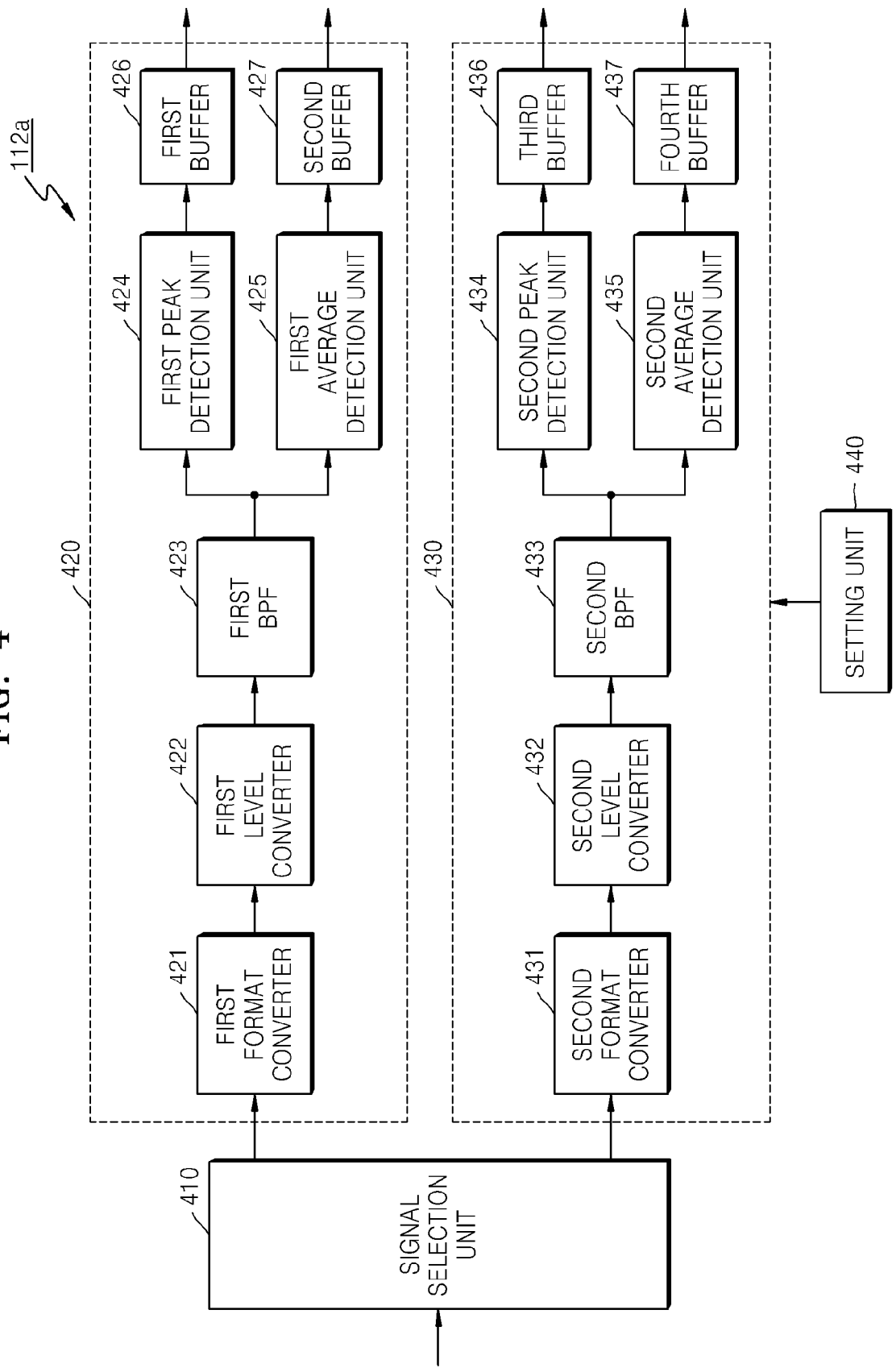
FIG. 4 is a view of an example of an auto-focusing signal processing unit according to an embodiment of the invention.

FIG. 4 is a view of an example of an auto-focusing signal processing unit 112a according to an embodiment of the invention. The auto-focusing signal processing unit 112a according to the current embodiment includes a signal selection unit 410, a low frequency signal processing unit 420, a high frequency signal processing unit 430, and a setting unit 440.

The signal selection unit 410 may output an imaging signal input by the imaging device 120 to the low frequency signal processing unit 420 or the high frequency signal processing unit 430. The signal selection unit 410 may output a live-view signal generated by the first group of pixels G1 to the low frequency signal processing unit 420, and may output an auto-focusing detection signal generated by the second group pixels G2 to the high frequency signal processing unit 430. The signal selection unit 410 may determine whether the imaging signal is to be output to either the low frequency signal processing unit 420 or the high frequency signal processing unit 430, according to a control signal input by the setting unit 440.

The setting unit 440, when the live-view signal is input to the auto-focusing signal processing unit 112a, may allow the signal selection unit 410 to output the live-view signal to the low frequency signal processing unit 420, and when the auto-focusing detection signal is input to the auto-focusing signal processing unit 112a, may allow the signal selection unit 410 to output the auto-focusing detection signal to the high frequency signal processing unit 430. Also, the setting unit 440 may change a set value of the low frequency signal processing unit 420 or the high frequency signal processing unit 430 according to a user's setting or a control signal generated by the CPU/DSP 170. For example, according to control of the setting unit 440, set values of a first level converter 422, a first band pass filter (BPF) 423, a second level converter 432, and a second BPF 433 may be changed.

The low frequency signal processing unit 420 may include a first format converter 421, the first level converter 422, the first BPF 423, a first peak detection unit 424, a first average detection unit 425, a first buffer 426, and a second buffer 427.

Regarding a live-view signal, the first format converter 421 converts a format thereof, and the first level converter 422 converts a signal level thereof. The BPF 423 passes only a signal having a predetermined low frequency band. From the signal output by the first BPF 423, the first peak detection unit 424 detects a peak and stores the peak in the first buffer 426, and the first average detection unit 425 detects an average value and stores the average value in the second buffer 427. Data stored in the first buffer 426 and the second buffer 427 is output as a low frequency detection signal to the auto-focusing processing unit 114.

The high frequency signal processing unit 430 includes a second format converter 431, the second level converter 432, the second BPF 433, a second peak detection unit 434, a second average detection unit 435, a third buffer 436, and a fourth buffer 437.

Regarding an auto-focusing detection signal, the second format converter 431 converts a format thereof, and the second level converter 432 converts a signal level thereof. The second BPF 433 passes only a signal having a predetermined high frequency band. From the signal output by the second BPF 433, the second peak detection unit 434 detects a peak and stores the peak in the third buffer 436, and the second average detection unit 435 detects an average value and stores the average value in the fourth buffer 437. Data stored in the third buffer 436 and the fourth buffer 437 is output as a high frequency detection signal to the auto-focusing processing unit 114.

Figure 5:
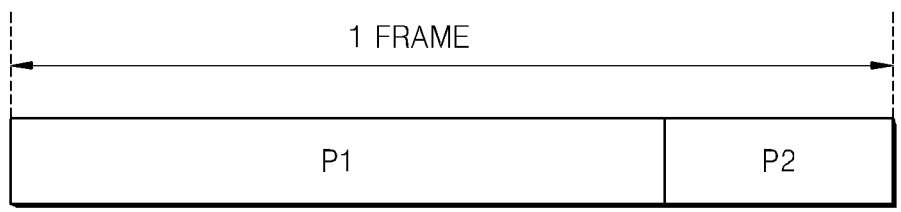
FIG. 5 is a view illustrating an example of a method of driving an imaging device according to an embodiment of the invention.

FIG. 5 is a view illustrating an example method of driving the imaging device 120 according to an embodiment of the invention. According to the current embodiment, during one frame, the imaging device 120 has a live-view read out section P1 and an auto-focusing detection signal read out section P2. During the live-view read out section P1, a live-view signal is read out from the first group pixels G1. During the auto-focusing detection signal read out section P2, an auto-focusing detection signal is read out from the second group of pixels G2. The reading-out may be executed sequentially according to a row order while pixels PX to be read out are selected according to selection signals in a row unit.

Figure 6:
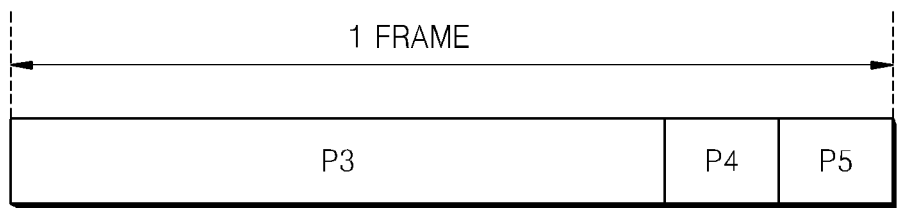
FIG. 6 is a view illustrating an example of a method of driving pixels PX of an imaging device according to an embodiment of the invention.

FIG. 6 is a view illustrating an example of a method of driving pixels PX of the imaging device 120 according to an embodiment of the invention. According to the current embodiment, during one frame, each of the pixels PX has an exposure section P3, a read out section P4, and a reset section P5. During the exposure section P3, the pixels PX are exposed and an imaging signal that is electrical and is generated according to incident light is accumulated. The imaging signal may be accumulated in a capacitor included in each of the pixels PX. During the read out section P4, in response to a selection signal pulse, imaging signals accumulated in the pixels PX are output to the read out unit 250 via read out lines ROL. During the reset section P5, in response to a reset signal pulse, the pixels PX are reset. For example, in response to a reset signal pulse, an image sensor, a capacitor, a voltage of a node, etc. included in each of the pixels PX may be reset.

Figure 7:
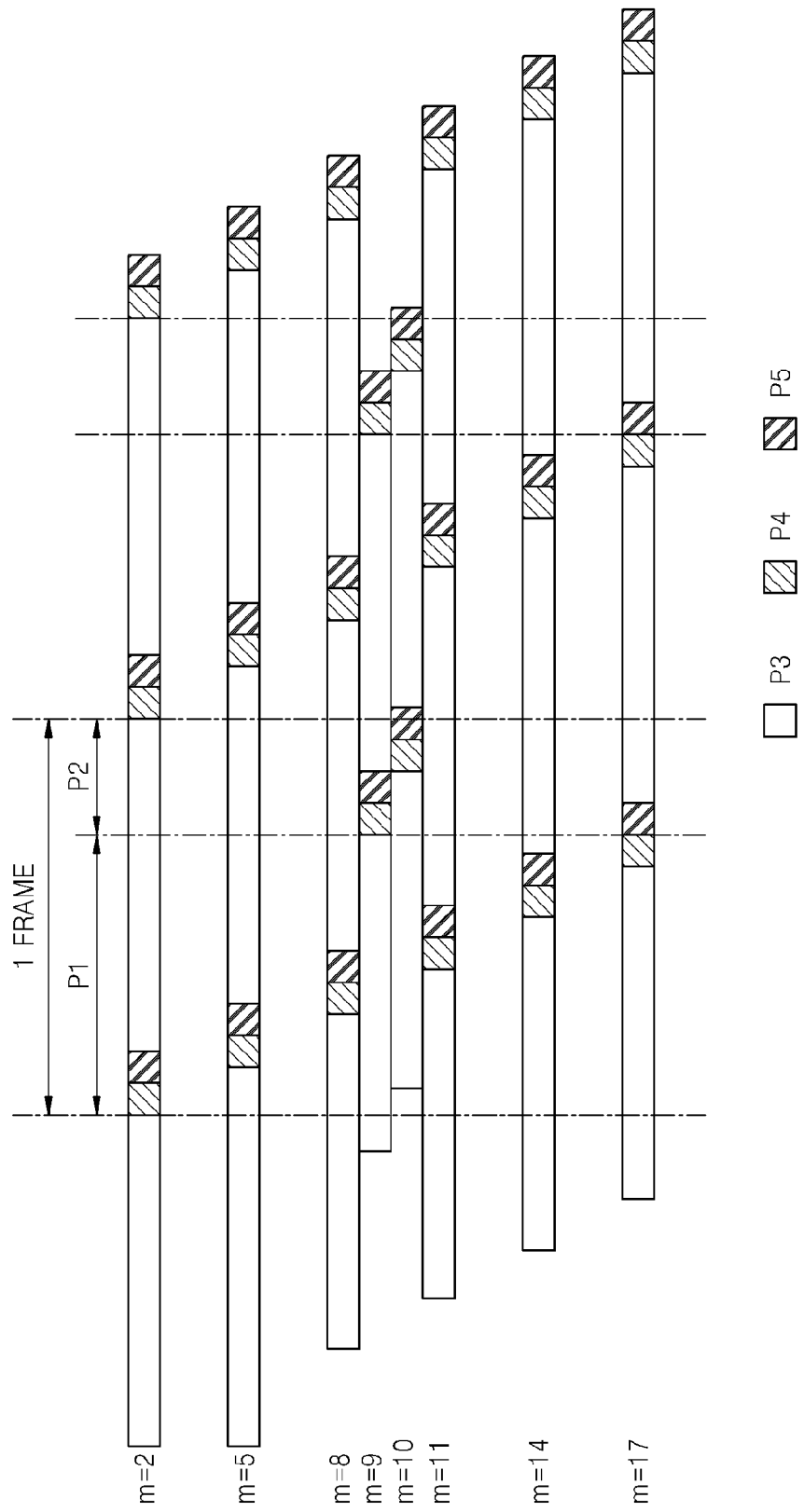
FIG. 7 is a timing diagram illustrating an example of a method of driving an imaging device according to an embodiment of the invention.

FIG. 7 is a timing diagram illustrating an example of a method of driving the imaging device 120 according to an embodiment of the invention. Referring to FIG. 7, the first group of pixels G1 are located on rows 2, 5, 8, 11, 14, and 17, and the second group of pixels G2 are located on rows 9 and 10. Also, m=2, m=5, m=8, m=9, m=10, m=11, m=14, and m=17, respectively, show operations of rows 2, 5, 8, 9, 10, 11, 14, and 17.

As illustrated in FIG. 7, the exposure section P3, the read out section P4, and the reset section P5 are repeatedly executed with respect to respective rows. Also, during one frame, the live-view read out section P1 and the auto-focusing detection signal read out section P2 are executed. As illustrated in FIG. 7, during the live-view read out section P1, the first group of pixels G1 may be sequentially read out. When the live-view read out section P1 is terminated, during the auto-focusing detection signal read out section P2, the second group of pixels G2 may be sequentially read out.

When one frame is terminated, the live-view read out section P1 and the auto-focusing detection signal read out section P2 of a next frame are executed.

Figure 8:
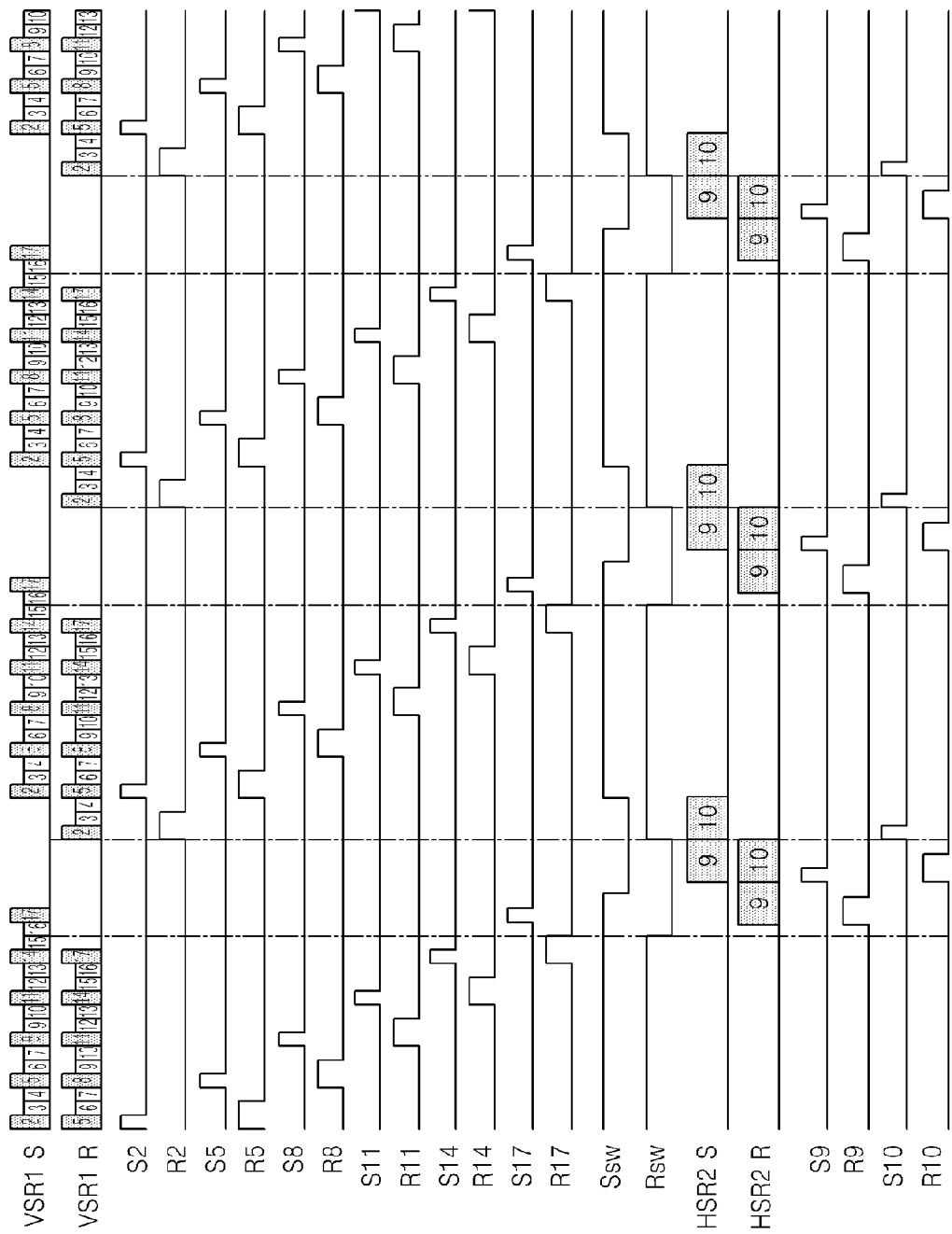
FIG. 8 is a timing diagram illustrating a wave form of each of signals of the timing diagram of FIG. 7.

FIG. 8 is a timing diagram illustrating a wave form of each of signals of the timing diagram of FIG. 7. Referring to FIG. 8, VSR1S and VSR1R are respectively a first reset signal and a first selection signal output by the first gate driving unit 210. VSR2S and VSR2R are respectively a second reset signal and a second selection signal output by the second gate driving unit 220. Regarding VSR1S and VSR1R, each number indicates a corresponding row, and a row having a high level indicates that a pulse is output in the row. For example, rows 2, 5, 8, etc. of VSR1S have a high level, and this indicates that these rows of pixels output a first selection signal pulse and a first reset signal pulse, and rows 3, 4, 6, 7, etc. of VSR1S have a low level, and this indicates that these rows of pixels do not output a first selection signal pulse and a first reset signal pulse.

Regarding VSR2S and VSR2R, each number indicates a corresponding row, and a row having a high level indicates that a second selection signal pulse or a second reset signal pulse is output in the row.

As illustrated in FIG. 8, during the live-view section P1, pulses of first selection signals R2, R5, R8, R11, R14, and R17 are sequentially output. Also, following the pulses of the first selection signals R2, R5, R8, R11, R14, and R17, pulses of first reset signal S2, S5, S8, S11, S14, and S17 are sequentially output.

Then, during the auto-focusing detection signal read out section P2, pulses of second selection signals R9 and R10 are sequentially output. Also, following the pulses of the second selection signals R9 and R10, pulses of second reset signals R9 and R10 are sequentially output.

Figure 9:
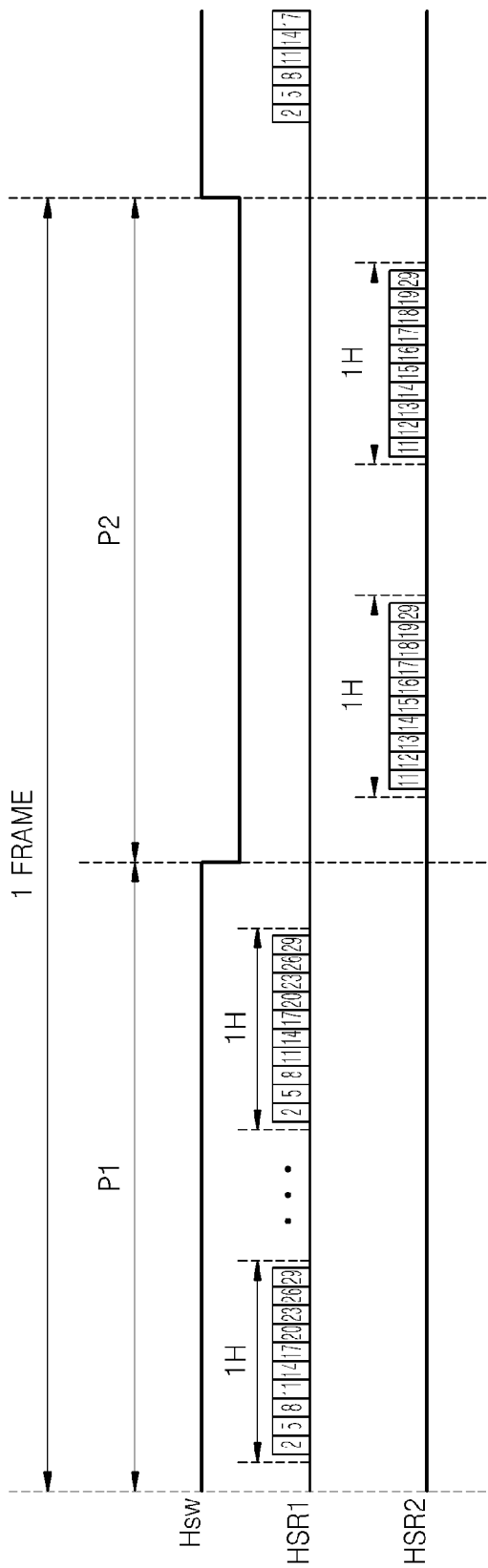
FIG. 9 is an example of a timing diagram illustrating an operation of an output unit according to an embodiment of the invention.

FIG. 9 is a timing diagram illustrating an operation of the output unit 260 according to an embodiment of the invention. In the timing diagram of FIG. 9, an Hsw signal denotes a control signal that is input to the plurality of switches Hsw included in the second selection unit 262. HSR1 denotes a first column selection signal that is output by the first selection controller 264. HSR2 denotes a second column selection signal that is output by the second selection controller 266. Each of numbers of pulses of HSR1 and HSR2 indicates a row in which a corresponding pulse is output. According to an embodiment of the invention, pulses of HSR1 and HSR2 may be output to an amplifier AMP of the read out unit 250 that corresponds to a row indicated by numbers of the pulses.

As illustrated in FIG. 9, during one frame, the output unit 260 has the live-view section P1 and the auto-focusing detection signal read out section P2.

During the live-view section P1, the read out unit 250 reads out a live-view signal from the first group pixels G1. The read out unit 250 reads out a live-view signal from rows in which the first group of pixels G1 are aligned during a horizontal period 1H, and during the live-view section P1, the read out unit 250 repeatedly executes reading-out with respect to the rows in which the first group of pixels G1 are aligned. During the live-view section P1, an Hsw signal has a first level that allows the switches Hsw included in the second selection unit 262 to select and output a first column selection signal.

During the auto-focusing detection signal read out section P2, the read out unit 250 reads out an auto-focusing detection signal from the second group of pixels G2. The read out unit 250 reads out an auto-focusing detection signal from rows in which the second group of pixels G2 are aligned during a horizontal period 1H, and during the auto-focusing detection signal read out section P2, the read out unit 250 repeatedly executes reading-out with respect to the rows in which the second group of pixels G2 are aligned. During the auto-focusing detection signal read out section P2, the Hsw signal has a second level that allows the switches Hsw included in the second selection unit 262 to select and output a second column selection signal.

Figure 10:
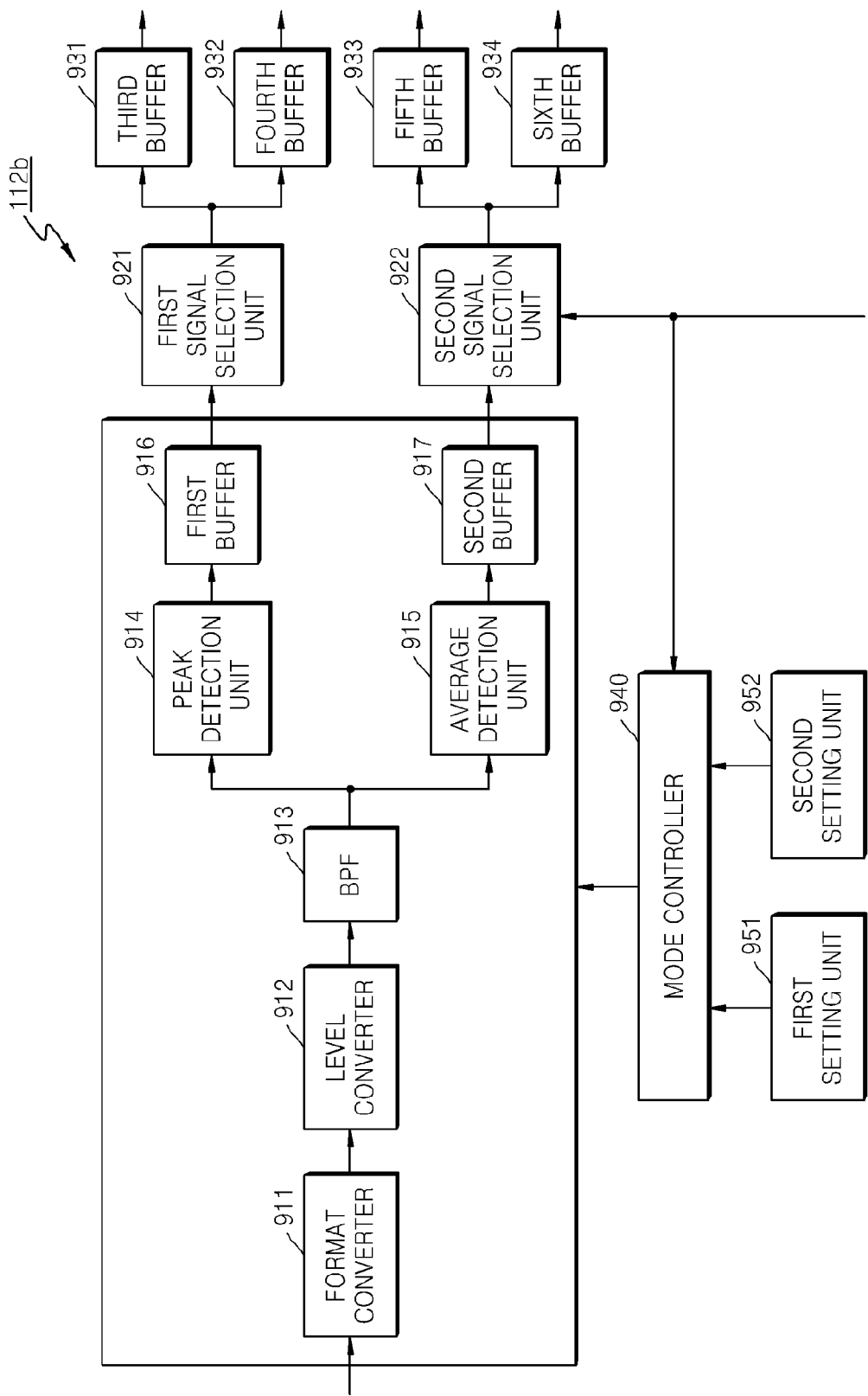
FIG. 10 is an example view of an auto-focusing signal processing unit according to another embodiment of the invention.

FIG. 10 is a view of an example of an auto-focusing signal processing unit 112b according to another embodiment of the invention. The auto-focusing signal processing unit 112b according to the current embodiment includes a format converter 911, a level converter 912, a BPF 913, a peak detection unit 914, an average detection unit 915, a first buffer 916, a second buffer 917, a first signal selection unit 921, a second signal selection unit 922, a third buffer 931, a fourth buffer 932, a fifth buffer 933, a sixth buffer 934, a mode controller 940, a first setting unit 951, and a second setting unit 952.

According to the current embodiment, a signal process is executed using a hardware structure, such as a live-view signal and an auto-focusing detection signal, while setting of the level converter 912, the BPF 913, the first signal selection unit 921, and the second signal selection unit 922 is changed according to an input signal. To do this, the first setting unit 951, when a live-view signal is input to the auto-focusing signal processing unit 112b, generates a set value for generating a low frequency detection signal, and the second setting unit 952, when an auto-focusing detection signal is input to the auto-focusing signal processing unit 112b, generates a set value for generating a high frequency detection signal. The mode controller 940 controls the level converter 912, the BPF 913, the first signal selection unit 921, and the second signal selection unit 922 according to set values generated by the first setting unit 951 and the second setting unit 952.

When a live-view signal is input, the auto-focusing signal processing unit 112b is set according to a set value that is generated by the first setting unit 951. Regarding a live-view signal, the format converter 911 converts a format thereof, and the level converter 912 converts a signal level thereof. The BPF 913 passes only a low frequency band signal that is set according to the set value of the first setting unit 951. From the signal output by the BPF 913, the peak detection unit 914 detects a peak and stores the peak in the first buffer 916, and the average detection unit 915 detects an average value and stores the average value in the second buffer 917. When the auto-focusing signal processing unit 112b is set according to the set value generated by the first setting unit 951, the first signal selection unit 921 outputs data stored in the first buffer 916 to the third buffer 931, and the second signal selection unit 922 outputs data stored in the second buffer 917 to the fifth buffer 933. Data stored in the third buffer 931 and the fifth buffer 933 is output as a low frequency detection signal to the auto-focusing processing unit 114.

When an auto-focusing detection signal is input, the auto-focusing signal processing unit 112b is set according to a set value generated by the second setting unit 952. Regarding an auto-focusing detection signal, the format converter 911 converts a format thereof, and the level converter 912 converts a signal level thereof. The BPF 913 passes only a high frequency band signal that is set according to the set value generated by the second setting unit 952. From the signal output by the BPF 913, the peak detection unit 914 detects a peak and stores the peak in the first buffer 916, and the average detection unit 915 detects an average value and stores the average value in the second buffer 917. When the auto-focusing signal processing unit 112*b* is set according to the set value generated by the second setting unit 952, the first signal selection unit 921 outputs data stored in the first buffer 916 to the fourth buffer 932, and the second signal selection unit 922 outputs data stored in the second buffer 917 to the sixth buffer 934. Data stored in the fourth buffer 932 and the sixth buffer 934 is output as a high frequency detection signal to the auto-focusing processing unit 114.

Figure 11:
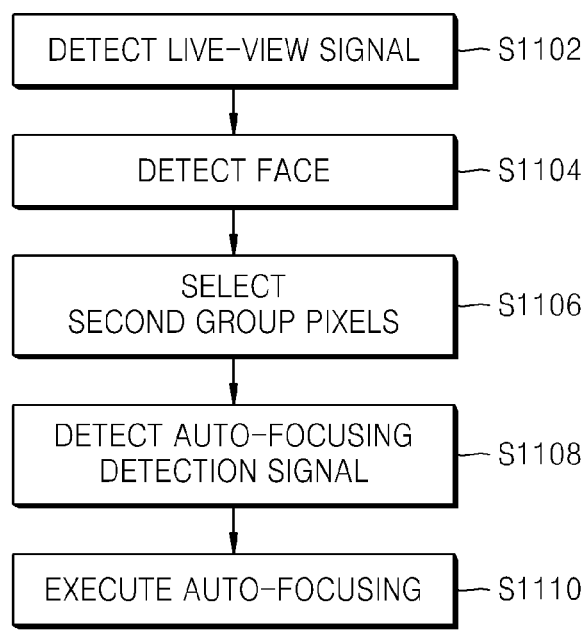
FIG. 11 is an example of a flowchart illustrating an auto-focusing method according to an embodiment of the invention.

FIG. 11 is a flowchart illustrating an example of an auto-focusing method according to an embodiment of the invention. According to the current embodiment, the second group pixels G2 are selected according to where a face is detected by referring to a live-view signal.

First, a live-view signal from the first group of pixels G1 is detected (S1102). The face detection unit 172 executes face detection by using the live-view signal (S1104). When a face is detected, a plurality of the second group of pixels G2 corresponding to a face detection area are selected (S1106). In this case, the second group pixels G2 are selected from among pixels other than the first group of pixels G1. When the plurality of second group of pixels G2 are selected (S1106), an auto-focusing detection signal is detected from the second group of pixels G2 (S1108), and auto-focusing (S1110) is executed using the live-view signal and the auto-focusing detection signal.

Figure 12:
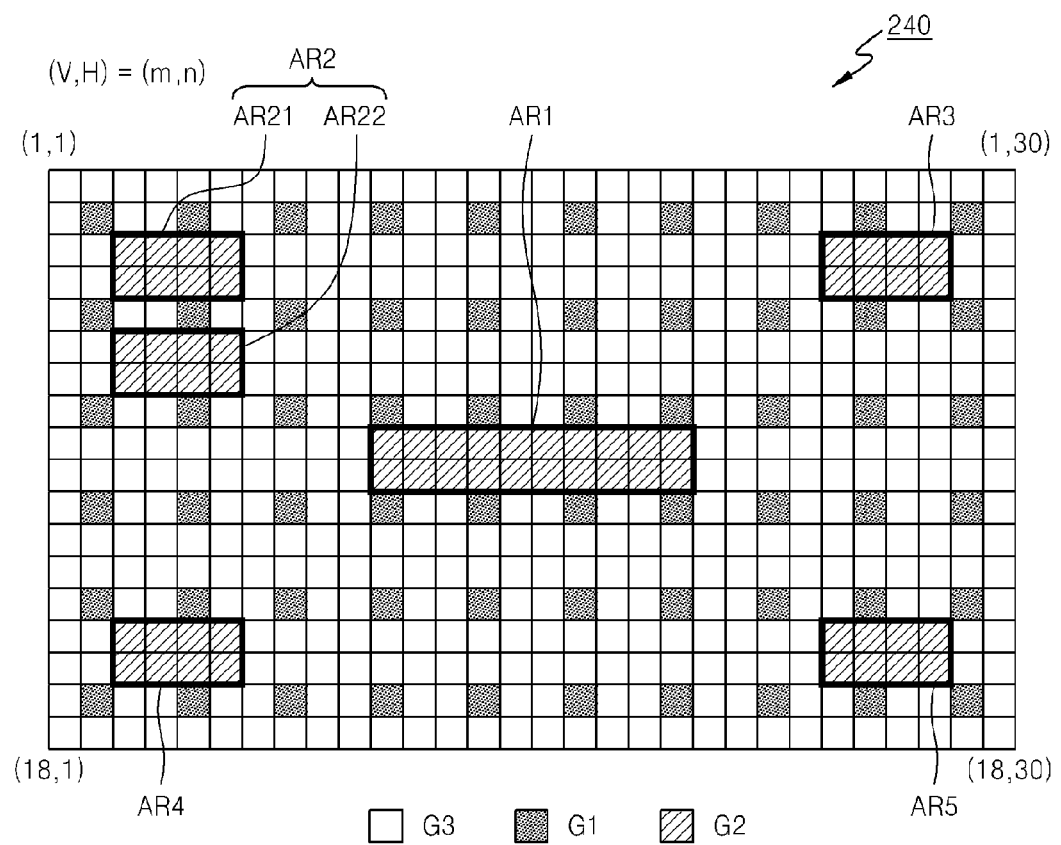
FIG. 12 is a view illustrating an example of a pixel arrangement of an imaging device according to an embodiment of the invention.

FIG. 12 is a view illustrating a pixel arrangement of the imaging device 120 according to an embodiment of the invention.

According to the current embodiment, the second group of pixels G2 may be located in various areas. For example, the second group of pixels G2 may be defined in a first area AR1, a second area AR2, a third area AR3, a fourth area AR4, and a fifth area AR5. Also, the second group of pixels G2 may be located in the second area AR2 including two areas AR21 and AR22 not adjacent to each other. In some embodiments, the second group of pixels G2 may include some pixels from the first group of pixels G1.

As described in the current embodiment, if there are many areas in which the second group of pixels G2 are able to be located, the second group of pixels G2 may be selected according to a user's selection, control of the auto-focusing processing unit 114, or control of the CPU/DSP 170. According to an embodiment of the invention, the auto-focusing processing unit 114 may determine an area in which high-frequency auto-focusing is to be executed according to results of low-frequency auto-focusing and thus determine an area in which the second group pixels G2 are located. According to another embodiment, the CPU/DSP 170 determines an area in which the second group pixels G2 are located according to a location of a face that is detected by the face detection unit 172.

Embodiments of the invention enable the advantage of continuous exposure of pixels of an imaging device while low-frequency auto-focusing and high-frequency auto-focusing are simultaneously executed using an imaging signal.

Meanwhile, auto-focusing methods according to embodiments of the invention may be embodied as a non-transitory computer-readable storage media for storing program codes that are used to execute the methods. Examples of the computer-readable storage media are random-access memory (RAM), read-only memory (ROM), flash memory, CD-ROM, floppy disks, magnetic tapes, optical data storage devices, etc. Also, the methods may be embodied in, for example, a transmission form via the Internet. The computer readable recording media may also be distributed over network coupled computer systems so that the computer readable code is stored and executed in a distributed fashion.

The program codes may execute operations for embodying auto-focusing methods according to embodiments of the invention when they are read and executed by the CPU/DSP 170 from the computer readable recording media. The program codes may be embodied as various programming languages. Also, one of ordinary skill in the art may easily program functional programs, codes, and code segments for embodying the invention.

For the purposes of promoting an understanding of the principles of the invention, reference has been made to example embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, Assembly, or the like, with the various algorithms being implemented with any combination of data structures, objects, processes, routines, or other programming elements. Functional aspects may be implemented in algorithms that execute on one or more processors. Furthermore, the invention could employ any number of conventional techniques for electronics configuration, signal processing and/or control, data processing, and the like. The words "mechanism", "element", "means", and "configuration" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development, and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections, or logical connections may be present in a practical device. Moreover, no item or component is essential to the practice of the invention unless the element is specifically described as "essential" or "critical".

The use of the terms "a" and "an" and "the" and similar referents in the context of describing the invention especially in the context of the following claims are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The invention is not limited to the described order of the steps. The use of any and all examples, or exemplary language, e.g., "such as", provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

According to embodiments of the invention, auto-focusing may be executed using a signal generated by an imaging device, while low-frequency auto-focusing and high-frequency auto-focusing are simultaneously executed, and a live-view screen is continuously supplied.

According to embodiments of the invention, while low-frequency auto-focusing and high-frequency auto-focusing are simultaneously executed using an imaging signal, pixels of an imaging device may be continuously exposed.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. An auto-focusing method comprising:
   reading out a live-view signal from a first group of pixels that are arranged in a periodic array having a uniform spacing between pixels that is greater than one pixel, wherein each pixel in the first group of pixels is separated from its nearest neighbors by the same uniform spacing that is greater than one pixel, so that the live-view signal represents a low-frequency signal;
   reading out an auto-focusing detection signal from a second group of pixels;
   performing a contrast auto-focus operation using both the live-view signal and the auto-focusing detection signal, wherein the pixels in the second group of pixels are located adjacent to each other in a region in which the first group of pixels are not located, and
   wherein the location of the second group of pixels is determined based on features of the live view signal and the location of the second group of pixels changes as the live view signal changes.

2. The auto-focusing method of claim 1, wherein the auto-focusing comprises:
   executing low-frequency auto-focusing using the live-view signal; and
   executing high-frequency auto-focusing using the auto-focusing detection signal.

3. The auto-focusing method of claim 1, wherein the first group of pixels are spaced apart from each other at constant intervals, and the second group of pixels are adjacent to each other.

4. The auto-focusing method of claim 1, wherein the second group of pixels are selected from among pixels in an area in which the first group of pixels are not located.

5. The auto-focusing method of claim 1, further comprising:
   detecting a face by using the live-view signal; and
   determining the second group of pixels according to where the face is detected.

6. The auto-focusing method of claim 1, wherein the first group of pixels are continuously exposed when the auto-focusing detection signal is read out, and the second group pixels are continuously exposed when the live-view signal is read out.

7. A digital photographing apparatus comprising:
   an imaging device comprising a plurality of pixels comprising a first group of pixels and a second group of pixels wherein the first group of pixels are arranged in a periodic array having a uniform spacing between pixels that is greater than one pixel, wherein each pixel in the first group of pixels is separated from its nearest neighbors by the same uniform spacing that is greater than one pixel, so that a live-view signal read from the first group of pixels represents a low-frequency signal;
   an optical system that collects an optical signal and transmits the optical signal to the imaging device; and
   an auto-focusing processing unit configured:
      to execute a contrast auto-focus operation using both the live-view signal detected from the first group of pixels and an auto-focusing detection signal detected from the second group of pixels, and
      to control the optical system,
   wherein the pixels in the second group of pixels are located adjacent to each other in a region in which the first group of pixels are not located, and
   wherein the location of the second group of pixels is determined based on features of the live view signal and the location of the second group of pixels changes as the live view signal changes.

8. The digital photographing apparatus of claim 7, wherein the auto-focusing processing unit is configured to execute auto-focusing by using a low frequency detection signal generated from the live-view signal and a high frequency detection signal generated from the auto-focusing detection signal.

9. The digital photographing apparatus of claim 7, further comprising an auto-focusing signal processing unit configured to process the live-view signal and the auto-focusing detection signal, wherein the auto-focusing signal processing unit comprises:
   a low frequency signal processing unit configured to generate a low frequency detection signal by using the live-view signal; and
   a high frequency signal processing unit configured to generate a high frequency detection signal by using the auto-focusing detection signal.

10. The digital photographing apparatus of claim 7, wherein the imaging device further comprises:
    a first gate driving unit configured to sequentially output a first selection signal for reading out the first group of pixels and configured to sequentially output a first reset signal for resetting the first group of pixels;
    a second gate driving unit configured to sequentially output a second selection signal for reading out the second group of pixels and configured to sequentially output a second reset signal for resetting the second group pixels;
    a read out unit configured to read out a detection signal from the pixels; and
    an output unit configured to output a live-view signal by selecting detection signals of the first group pixels from among the read out signals, or an auto-focusing detection signal by selecting detection signals of the second group of pixels from among the read out signals.

11. The digital photographing apparatus of claim 7, wherein the first group of pixels are pixels that are spaced apart from each other at constant intervals, and the second group of pixels are pixels that are adjacent to each other.

12. The digital photographing apparatus of claim 7, wherein the second group of pixels are selected from among pixels in an area in which the first group of pixels are not located.

13. The digital photographing apparatus of claim 7, further comprising a face detection unit configured to detect a face from the live-view signal,
wherein the auto-focusing processing unit determines the second group of pixels according to where the face is detected.

14. The digital photographing apparatus of claim 7, wherein the first group pixels are continuously exposed when the auto-focusing detection signal is read out, and the second group pixels are continuously exposed when the live-view signal is read out.

15. A non-transitory computer program product, comprising a computer usable medium having a computer readable program code embodied therein, said computer readable program code adapted to be executed to implement a method for auto-focusing, said method comprising:
reading out a live-view signal from a first group of pixels that are arranged in a periodic array having a uniform spacing between pixels that is greater than one pixel, wherein each pixel in the first group of pixels is separated from its nearest neighbors by the same uniform spacing that is greater than one pixel, so that the live-view signal represents a low-frequency signal;
reading out an auto-focusing detection signal from a second group of pixels;
performing a contrast auto-focus operation using both the live-view signal and the auto-focusing detection signal,
wherein the pixels in the second group of pixels are located adjacent to each other in a region in which the first group of pixels are not located, and
wherein the location of the second group of pixels is determined based on features of the live view signal and the location of the second group of pixels changes as the live view signal changes.

16. The non-transitory computer program product of claim 15, wherein the auto-focusing comprises:
executing low-frequency auto-focusing using the live-view signal; and
executing high-frequency auto-focusing using the auto-focusing detection signal.

17. The non-transitory computer program product of claim 15, wherein the first group of pixels are pixels that are spaced apart from each other at constant intervals, and the second group of pixels are pixels that are adjacent to each other.

18. The non-transitory computer program product of claim 15, wherein the second group of pixels are selected from among pixels in an area in which the first group of pixels are not located.

19. The non-transitory computer program product of claim 15, wherein the auto-focusing method further comprises:
detecting a face by using the live-view signal; and
determining the second group of pixels according to where the face is detected.

20. The non-transitory computer program product of claim 15, wherein the first group of pixels are continuously exposed when the auto-focusing detection signal is read out, and the second group of pixels are continuously exposed when the live-view signal is read out.

* * * * *